Sept. 15, 1959  R. E. RICHARDSON  2,903,825
GLASS BENDING MOULDS

Filed Nov. 7, 1956  2 Sheets-Sheet 1

INVENTOR:

RONALD E. RICHARDSON

BY: Cushman, Darby & Cushman
ATTORNEYS

Sept. 15, 1959 R. E. RICHARDSON 2,903,825
GLASS BENDING MOULDS

Filed Nov. 7, 1956 2 Sheets-Sheet 2

INVENTOR:

RONALD E. RICHARDSON

BY: Cushman, Darby & Cushman
ATTORNEYS

United States Patent Office 2,903,825
Patented Sept. 15, 1959

2,903,825

GLASS BENDING MOULDS

Ronald E. Richardson, Oshawa, Ontario, Canada, assignor to Pittsburgh Plate Glass Company, Pittsburgh, Pa.

Application November 7, 1956, Serial No. 620,865

Claims priority, application Canada July 2, 1955

8 Claims. (Cl. 49—67)

This invention relates to improvements in the construction of moulds such as are employed in the bending of elongated glass sheets to curved form. The advent of "wrap-around" windshields in automobile design has given rise to the need for efficient moulds for the initial processing of the elongated glass sheets that will ultimately form the laminated safety glass of such "wrap-around" windshields. A "wrap-around" windshield consists of an elongated sheet of laminated glass of gentle curvature at its centre, the radius of curvature decreasing sharply at each end until the glass is extending almost perpendicular to the main body of the glass.

The technique employed in forming such "wrap-around" windshields, or like objects of curved laminated glass for automobile windows or other applications, is to lay a pair of flat elongated glass sheets on a mould which is so arranged as to tend to take up its final configuration when so permitted by the softening of the glass. The mould and glass sheets are passed through a furnace in which the glass is raised to a temperature sufficient to render it yieldable to the forces exerted upon it by the mould. In this manner the required shape is imparted to the glass. Subsequently the two sheets are annealed, an intermediate lamination of a synthetic resinous material is placed between them and they pass to the rolling and pressure treatments before emerging as a finished product. A similar bending operation is employed in manufacturing the tempered type of non-laminated safety glass.

The present invention is concerned with the construction of moulds for the preliminary bending of one ot more such sheets during passage through a furnace.

It has become the practice to form moulds for this purpose with pivoted end portions each of which either can be swung into a first position (when the flat, cold glass is originally placed in position thereon—subsequently referred to as the "flat" position of the mould), or can move into a second position (the "curved" position of the mould) as the resistance to bending of the glass decreases on exposure to higher temperatures. Weights tending to urge the movable portions of the mould into such latter position are normally provided.

The present invention provides a device mounted adjacent a pivoted end mould portion for improving the bending operation, such device comprising a body of metal of thermal capacity large in relation to the neighbouring mould parts, said body being mounted on the main mould portion so as to be positioned outwardly of the perimeter of the movable end mould portion and, in the "flat" orientation of the mould, adjacent said end portion.

Glass bending moulds normally fall into one of two classes—concave or convex moulds—depending on whether the glass is cradled within a concavely curved mould or wrapped around a convexly curved one. The present invention is directed towards a construction of mould primarily applicable to the concave type of mould and for this reason the invention will be exemplified below with reference to a concave mould. The basic essentials of the present invention are, however, equally applicable to a convex mould as will become apparent from the subsequent description.

The present application is a continuation-in-part of United States patent application No. 591,913 filed June 18, 1956, now Patent No. 2,861,396 issued November 25, 1958. Reference may be made to such parent application for many details of construction of the mould, and in particular for details of the manner in which the end mould portions may themselves be subdivided into more than one section. To facilitate understanding of the feature with which this application is concerned the accompanying drawings have been simplified to omit many of the features of the parent application, so that these drawings show the present invention employed with an elementary form of mould provided with a simple unitary movable end portion.

The drawings illustrate approximately one half of a concave skeleton mould. The other half of the mould is identical in mirror image and has thus not been illustrated.

Figure 3:
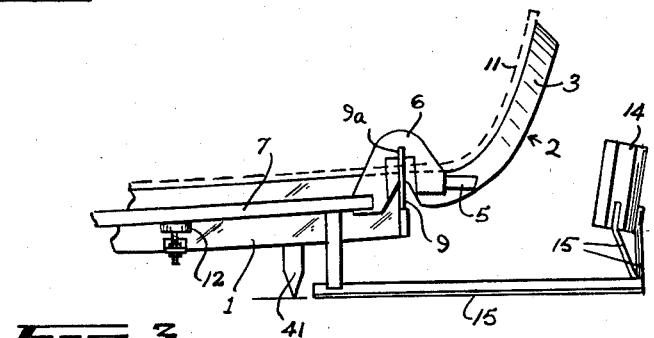
Figure 3 is a view similar to Figure 2 but showing the parts in the curved position assumed after bending of the glass.

The main side bars of the main mould portion are each designated by the reference numeral 1, the movable end portion of the end of the mould visible in the drawings being shown generally at 2. This mould portion 2 consists essentially of a bar 3 which, in the curved condition of the mould (Figure 3) forms a smooth contiguous continuation of the side bars 1.

Figure 1:
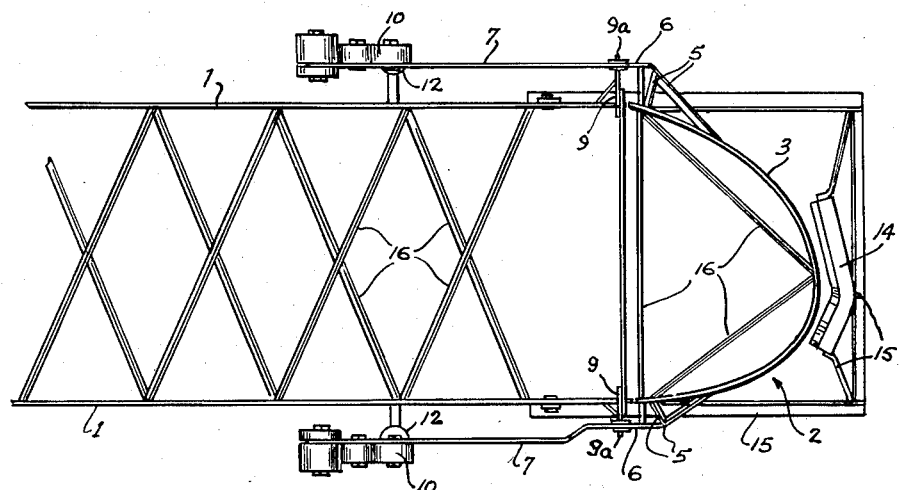
Figure 1 shows a plan view of the mould half, in the initial "flat" position of the parts prior to bending of the glass.
Figure 2:
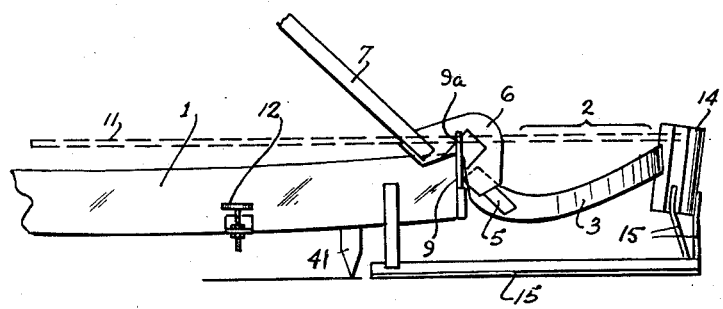
Figure 2 is a side view of the mould half seen in Figure 1, with the parts in the same position.

Each end of the bar 3 is connected by suitable struts 5 to an arched bracket 6 to which there is further secured an arm 7 extending generally away from the end portion 2 and, when the parts are in the "flat" position of Figures 1 and 2, upwardly at an angle approximately equal to that through which it is desired to pivot the end portion 2. The two brackets 6 serve to mount the movable end portion 2 on a pair of vertical plates 9 terminating in upwardly projecting fingers 9a and each secured to an end of one of the main side bars 1. A set of weights 10 is secured to the free end of each of the arms 7 and has the effect of tending to rotate the end portion 2 in an anti-clockwise direction from the "flat" position seen in Fig. 2 to the concave position seen in Figure 3. As will appear from the latter figure, in the fully rotated position the arms 7 come to rest each against an adjustable stop 12, the positions of which stops thus determine the limit of anti-clockwise rotation of the end portion, 2. As best seen from Figure 1, the arms 7 are disposed outwardly of the side bars 1 in order to be free to move downwardly without encountering the glass sheet which will overlap the edges of the bar 1 by a small amount.

Normally when the mould is being employed as a step in the manufacture of laminated windshields, two sheets of glass, one on top of the other, will be laid on the mould so as to be bent simultaneously and thus always match one another perfectly. This pair of glass sheets is shown diagrammatically by the broken lines 11 in Figures 2 and 3. When the tempered type of non-laminated safety glass is being manufactured, a single such glass sheet may be bent alone.

The feature of the present invention is a thermal ballast device 14 consisting of a comparatively massive block of metal stationarily mounted on supporting members 15 of the main mould portion so that, in the "flat" orientation of the mould, it lies outwardly of, but close to the outward end of the mould portion 2 and the extreme end of the glass that rests on such end mould portion 2.

The remaining portions of the mould illustrated in the drawings are conventional supporting legs 41 and conventional bracing members 16 extending between the side bars 1 and between the parts of the bar 3 of the end portion 2.

When the mould is to be used, the glass sheets 11 are laid on top of the mould which will thus be held in the "flat" condition of Figures 1 and 2, the weight and rigidity of the glass 11 initially acting against the forces exerted by the weights 10 to prevent upward movement of each end portion 2 of the mould. This condition remains until the glass begins to soften as a result of the increasing temperatures that it encounters on being fed through a lehr. Gradually the upward bending force exerted by the weights 10 will take charge and the glass will allow each of the end portions 2 to swing slowly and uniformly upwards. Finally the arms 7 will come to rest on the stops 12 and the parts will then be in the position illustrated in Figure 3 with the glass smoothly bent to the required shape.

The thermal ballast device 14 has the effect of tending to delay the bending of the extreme tip of the glass 11 in the vicinity of such device. As the mould is passed through the lehr, all its parts as well as the glass are rapidly heated. Those parts having large thermal capacities will naturally take longer to attain the high temperatures of the lehr than the parts with smaller thermal capacities. In other words, at any time during the heating up of the glass and mould parts by the lehr, the thermal ballast device 14 will be rather cooler than the less massive parts of the mould and the surrounding atmosphere, and will thus have an appreciable cooling effect on the end portion of the glass. This has the effect of delaying bending of the glass in the vicinity of its tip and thus causing the glass to start to bend at the waist, i.e. at the part above the line of junction of the main end portions of the mould. As soon as the glass bends at the waist and the end portion starts to move upwardly, the tip of the glass is moved away from the ballast device 14 which is fixed to the main portion of the mould. As a result the cooling effect of the ballast device becomes less and less until finally, when the parts reach the fully curved position seen in Figure 3, it no longer has any significant effect at all.

In this manner the tip of the glass is prevented from bending until the waist has commenced to bend, and the result is a more satisfactory operation.

Figure 4:
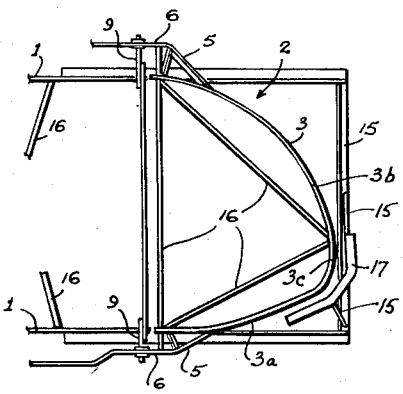
Figure 4 is a fragmentary plan view of one end of the mould in the "flat" orientation, this figure being generally similar to Figure 1 although showing less of the body of the mould, and illustrating a modified form of ballast device.
Figure 6:
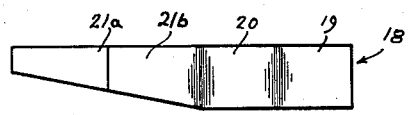
Figure 6 is a view of the ballast device of Figure 5 seen alone and in the direction indicated by the arrows VI—VI in Figure 5.
Figure 5:
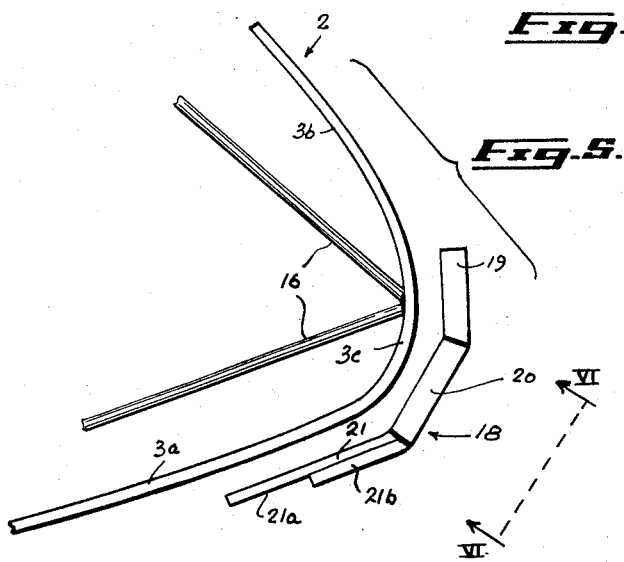
Figure 5 is a still further fragmentary view of the extreme end of a mould on a much enlarged scale, illustrating a further modification to the ballast device.

Attention is now invited to Figs. 4 to 6. As before, the mould consists of side bars 1 and movable end portions 2 each of which consists principally of a bent bar 3 which co-operates with the bars 1 to define the curved periphery of the mould. The end mould portion 2 visible in Figure 4 is mounted on plates 9 by struts 5 and brackets 6, and bracing members 16 are provided, as before.

In Figure 4 the supporting members 15 are shown as serving to position a thermal ballast device 17 outwardly of and closely adjacent the end tip of the end mould portion 2. This ballast device 17 will be in close proximity to the tip of the mould portion 2 when the parts are in the "flat" orientation, in which respect the ballast device 17 will be similarly positioned to the ballast device 14. This relationship is seen in Figure 2 and is essential to the invention. No modification is accordingly envisaged to this relationship, the chief difference which Figure 4 is provided to illustrate residing in the modified disposition of the ballast device 17 peripherally of the bar 3 of the end mould portion 2.

It will be observed that in the mould shown in Figure 4, the bar 3 is composed of a relatively straight portion 3a and a more curved portion 3b, these two portions joining one another at the rounded tip 3c. This is a shape of end mould portion dictated by some modern windshield designs.

It has now been discovered that the delaying effect of the ballast device is required more along the straight portion of the mould than along the curved portion. For this reason the ballast device 17 is constructed so as to lie outwardly of the bar 3 and to extend approximately equidistance from the same from a point approximately in register with the tip 3c of the bar 3 to a point part way down the straighter portion 3a of such bar towards the side bars 1 of the main mould portion, which portion includes the fixed structure connected to the side bars 1. This manner of biasing the ballast device 17 to one side of the end mould portion is shown in Figure 4.

Figure 5 shows an enlarged view of an even smaller fragment of the end portion 2 of a glass bending mould, and serves to illustrate a slightly modified form of ballast device 18. Figure 6 shows a side view of the ballast device 18 which is formed in three sections. The thick metal of which these ballast devices are made renders it more convenient to build up the whole device by welding separate pieces together, rather than attempting to form bends in a flat block of material. The ballast device 18 is formed of three sections 19, 20 and 21 of thick mild steel (typical dimensions would be a thickness of three-quarters of an inch and a vertical height of 4 inches). The sections 19 and 20 are of uniform thickness and vertical height, but the tail section 21 which extends along the flat portion 3a of the bar 3 is stepped towards its free end both in respect of thickness (see Figure 5) and tapered in respect of vertical height (see Figure 6). In practice the tail section 21 is formed of two pieces of metal 21a and 21b welded together. For simplicity of illustration, the ballast device 18 has been shown as simultaneously incorporating both these methods of reducing the mass of metal at the end of the section 21. It will be evident that either form of reduction could be used alone, the purpose being gradually to diminish the cooling effect of the device 18 towards its end.

The positioning of a thermal ballast device outside the area encompassed by the mould bar minimizes the "shadow" effect which tends to result from any positioning of ballast devices within such area. A "shadow" effect is a shielding of the glass from the heaters positioned in the lehr along which the glass and mould are conveyed. It is thus important to appreciate that the function of the ballast devices of the present invention is not in any sense to shield the glass from the radiant heat emitted by the lehr heaters. Such an action would be undesirable, because shielding of the glass from the radiant heat of the lehr heaters results in sharp lines of demarcation of stress patterns within the glass. The function of the ballast devices is to extract a certain amount of heat from selected areas of the glass, after such heat has already been absorbed by the glass. The action is thus essentially a cooling rather than a shielding one, and a ballast device is better able to effect a cooling to the exclusion of any incidental shielding when positioned outwardly of the mould periphery.

Another benefit flowing from the positioning of a ballast device outwardly of the tip of the mould periphery is that the glass tip is more likely to adopt a slight concave transverse sag similar to the sag developed in the central portion of the glass over the main part of the mould, whereas, if ballast devices are positioned below the glass and within the area encompassed by the mould shaping bars, there is a tendency for a convex rather than a concave transverse curvature to appear in the glass tip, if any such transverse curvature is developed at all.

I claim:

1. A skeleton type glass bending mould comprising a main mould portion, an end mould portion pivotable relatively to said main mould portion between a "flat" orientation and a curved orientation, characterized by a body of metal of thermal capacity large in relation to the neighbouring mould parts, said body being mounted on the main mould portion so as to be positioned outwardly of the perimeter of the movable end mould portion and, in the "flat" orientation of the mould, adjacent said end portion.

2. A mould as claimed in claim 1, wherein said body is positioned adjacent a portion of the end mould portion remote from said main mould portion.

3. A mold as claimed in claim 1, wherein the periphery of said end mould portion is generally triangular, one side of such triangle lying adjacent and parallel to an end of the main mould portion, and wherein said body is positioned adjacent that apex of such triangle which lies opposite said side.

4. In a skeleton type glass bending mould comprising a main mould portion, a generally triangular end mould portion pivotable relatively to said main mould portion between a "flat" orientation and a curved orientation, a first side of such end portion lying adjacent and parallel to an end of the main mould portion; the provision of a body of metal of thermal capacity large in relation to the neighbouring mould parts, said body being mounted on the main mould portion so as to be positioned outwardly of the perimeter of the movable end mould portion and, in the "flat" orientation of the mould, to extend alongside a second side of said triangle.

5. In a skeleton type glass bending mould comprising a main mould portion, a generally triangular end mould portion pivotable relatively to said main mould portion between a "flat" orientation and a curved orientation, a first side of such end portion lying adjacent and parallel to an end of the main mould portion; the provision of a body of metal of thermal capacity large in relation to the neighbouring mould parts, said body being mounted on the main mould portion so as to be positioned outwardly of the perimeter of the movable end mould portion and, in the "flat" orientation of the mould, adjacent the apex of said end portion lying opposite said first side and adjacent a second side of such end portion to extend part way towards said first side.

6. In a skeleton type glass bending mould comprising a main mould portion, a generally triangular end mould portion pivotable relatively to said main mould portion between a "flat" orientation and a curved orientation, a first side of such end portion lying adjacent and parallel to an end of the main mould portion, a second side of such triangle being straight or only gently curved; the provision of a body of metal of thermal capacity large in relation to the neighbouring mould parts, said body being mounted on the main mould portion so as to be positioned outwardly of the perimeter of the movable end portion and, in the "flat" orientation of the mould, to extend alongside said second side.

7. A mould as claimed in claim 4, wherein the part of said body extending alongside said second side of the end mould portion is tapered towards its end nearer said first side of the end mould portion.

8. A skeleton type glass bending mould comprising a main mould portion, an end mould portion pivotable relatively to said main mould portion between a "flat" orientation and a curved orientation, and a body of metal of thermal capacity large in relation to its neighbouring mould parts, said body being mounted in fixed position on the main mould portion so as to be disposed outwardly of the perimeter of the movable end mould portion and, in the "flat" orientation of the mould only, adjacent said end portion.

References Cited in the file of this patent

UNITED STATES PATENTS

| | | |
|---|---|---|
| 2,240,349 | Preston | Apr. 29, 1941 |
| 2,452,488 | Paddock et al. | Oct. 26, 1948 |
| 2,695,476 | Jendrisak | Nov. 30, 1954 |
| 2,744,359 | Jendrisak | May 8, 1956 |

FOREIGN PATENTS

| | | |
|---|---|---|
| 1,076,391 | France | Apr. 21, 1954 |
| 710,393 | Great Britain | June 9, 1954 |
| 727,200 | Great Britain | Mar. 30, 1955 |